United States Patent
Lothian

(10) Patent No.: US 10,489,450 B1
(45) Date of Patent: Nov. 26, 2019

(54) SELECTING SOUNDTRACKS

(71) Applicant: Google Inc., Mountain View, CA (US)

(72) Inventor: Ryan James Lothian, London (GB)

(73) Assignee: Google LLC, Mountain View, CA (US)

( * ) Notice: Subject to any disclaimer, the term of this patent is extended or adjusted under 35 U.S.C. 154(b) by 829 days.

(21) Appl. No.: 14/633,049

(22) Filed: Feb. 26, 2015

Related U.S. Application Data

(60) Provisional application No. 61/946,559, filed on Feb. 28, 2014.

(51) Int. Cl.
*G06F 16/635* (2019.01)
*G06F 16/638* (2019.01)

(52) U.S. Cl.
CPC .......... *G06F 16/636* (2019.01); *G06F 16/639* (2019.01)

(58) Field of Classification Search
CPC ..... G11B 27/034; G11B 27/34; G11B 27/031; G06F 17/30017; G06F 17/30026; G06F 17/30056; G06F 17/3074; G06F 17/30781; G06F 17/30864; G06F 17/241; G10H 1/368; G10H 2240/085; G10L 25/48; H04L 51/063; H04L 51/08; H04N 21/23418; H04N 9/8211; G06K 9/00
USPC ................ 386/285, 230, 278; 715/230, 730; 382/190; 700/94; 455/466
See application file for complete search history.

(56) References Cited

U.S. PATENT DOCUMENTS

| | | | | |
|---|---|---|---|---|
| 2006/0122842 A1* | 6/2006 | Herberger | .............. | G10H 1/368 704/278 |
| 2012/0251082 A1* | 10/2012 | De Vos | .................. | H04N 5/765 386/285 |

\* cited by examiner

*Primary Examiner* — Duc Nguyen
*Assistant Examiner* — Alexander L Eljaiek
(74) *Attorney, Agent, or Firm* — IP Spring

(57) ABSTRACT

Implementations generally relate to selecting soundtracks. In some implementations, a method includes determining one or more sound mood attributes of one or more soundtracks, where the one or more sound mood attributes are based on one or more sound characteristics. The method further includes determining one or more visual mood attributes of one or more visual media items, where the one or more visual mood attributes are based on one or more visual characteristics. The method further includes selecting one or more of the soundtracks based on the one or more sound mood attributes and the one or more visual mood attributes. The method further includes generating an association among the one or more selected soundtracks and the one or more visual media items, wherein the association enables the one or more selected soundtracks to be played while the one or more visual media items are displayed.

20 Claims, 7 Drawing Sheets

SELECTING SOUNDTRACKS

CROSS REFERENCE TO RELATED APPLICATIONS

This application claims priority from U.S. Provisional Patent Application No. 61/946,559 entitled "SELECTING SOUNDTRACKS," filed Feb. 28, 2014, which is hereby incorporated by reference as if set forth in full in this application for all purposes.

BACKGROUND

Some media systems often enable users to upload media content such as photos, videos, music, etc. Such systems also enable users to share various media content such as videos with each other. Some systems enable users to play music tracks along with the media content.

SUMMARY

Implementations generally relate to selecting soundtracks. In some implementations, a computer-implemented method includes determining one or more sound mood attributes of one or more soundtracks, where the one or more sound mood attributes are based on one or more sound characteristics. The method further includes determining one or more visual mood attributes of one or more visual media items, where the one or more visual mood attributes are based on one or more visual characteristics. The method further includes selecting one or more of the soundtracks based on the one or more sound mood attributes and the one or more visual mood attributes. The method further includes generating an association among the one or more selected soundtracks and the one or more visual media items, wherein the association enables the one or more selected soundtracks to be played while the one or more visual media items are displayed.

With further regard to the method, in some implementations, the method further includes determining at least one sound mood attribute value for at least one of the sound mood attributes, wherein the at least one sound mood attribute value indicates to an intensity of mood, and wherein the at least one sound mood attribute value is used to select one or more of the soundtracks. In some implementations, the method further includes associating at least one soundtrack with at least one sound mood attribute value, and where the at least one sound mood attribute value is based on one or more of the sound characteristics. In some implementations, the one or more sound mood attributes are based on one or more of the sound characteristics, and where one or more of the sound characteristics include one or more of a music key and a tempo. In some implementations, the one or more visual mood attributes are based on one or more of the visual characteristics, and where one or more of the visual characteristics include one or more of content aspects and image aspects. In some implementations, the selecting of the one or more of the soundtracks comprises determining soundtracks having one or more sound mood attributes that correspond to one or more visual mood attributes of the one or more visual media items. In some implementations, wherein the method further comprises determining at least one sound mood attribute value for at least one of the sound mood attributes, wherein the at least one sound mood attribute value is used to select one or more of the soundtracks, and wherein the at least one sound mood attribute value based on a weighted average of separate sound mood attribute values.

In some implementations, a non-transitory computer-readable storage medium carries program instructions thereon, where the instructions when executed by one or more processors cause the one or more processors to perform operations including: determining one or more sound mood attributes of one or more soundtracks, where the one or more sound mood attributes are based on one or more sound characteristics; determining one or more visual mood attributes of one or more visual media items, where the one or more visual mood attributes are based on one or more visual characteristics; selecting one or more of the soundtracks based on the one or more sound mood attributes and the one or more visual mood attributes; and generating an association among the one or more selected soundtracks and the one or more visual media items, wherein the association enables the one or more selected soundtracks to be played while the one or more visual media items are displayed.

With further regard to the computer-readable storage medium, in some implementations, the instructions further cause the one or more processors to perform operations including determining at least one sound mood attribute value for at least one of the sound mood attributes, wherein the at least one sound mood attribute value indicates to an intensity of mood, and wherein the at least one sound mood attribute value is used to select one or more of the soundtracks. In some implementations, the instructions further cause the one or more processors to perform operations including associating at least one soundtrack with at least one sound mood attribute value, and where the at least one sound mood attribute value is based on one or more of the sound characteristics. In some implementations, the one or more sound mood attributes are based on one or more of the sound characteristics, and where one or more of the sound characteristics include one or more of a music key and a tempo. In some implementations, the one or more visual mood attributes are based on one or more of the visual characteristics, and where one or more of the visual characteristics include one or more of content aspects and image aspects. In some implementations, the selecting of the one or more of the soundtracks comprises determining soundtracks having one or more sound mood attributes that correspond to one or more visual mood attributes of the one or more visual media items. In some implementations, wherein the method further comprises determining at least one sound mood attribute value for at least one of the sound mood attributes, wherein the at least one sound mood attribute value is used to select one or more of the soundtracks, and wherein the at least one sound mood attribute value based on a weighted average of separate sound mood attribute values.

In some implementations, a system includes one or more processors, and logic encoded in one or more tangible media for execution by the one or more processors. When executed, the logic is operable to perform operations including: determining one or more sound mood attributes of one or more soundtracks, where the one or more sound mood attributes are based on one or more sound characteristics; determining one or more visual mood attributes of one or more visual media items, where the one or more visual mood attributes are based on the one or more sound mood attributes and the one or more visual mood attributes; selecting one or more of the soundtracks based on one or more selection criteria; and generating an association among the one or more selected soundtracks and the one or more visual media items, wherein the association enables the one or more selected soundtracks to be played while the one or more visual media items are displayed.

With further regard to the system, in some implementations, the logic when executed is further operable to perform operations including determining at least one sound mood attribute value for at least one of the sound mood attributes, wherein the at least one sound mood attribute value indicates to an intensity of mood, and wherein the at least one sound mood attribute value is used to select one or more of the soundtracks. In some implementations, the logic when executed is further operable to perform operations including associating at least one soundtrack with at least one sound mood attribute value, and where the at least one sound mood attribute value is based on one or more of the sound characteristics. In some implementations, the one or more sound mood attributes are based on one or more of the sound characteristics, and where one or more of the sound characteristics include one or more of a music key and a tempo. In some implementations, the one or more visual mood attributes are based on one or more of the visual characteristics, and where one or more of the visual characteristics include one or more of content aspects and image aspects. In some implementations, the selecting of the one or more of the soundtracks comprises determining soundtracks having one or more sound mood attributes that correspond to one or more visual mood attributes of the one or more visual media items.

DETAILED DESCRIPTION

Implementations described herein select soundtracks to be played while displaying visual media. In various implementations, a system determines one or more sound mood attributes of each soundtrack of a set of soundtracks. In various implementations, the sound mood attributes are based on sound mood characteristics. Sound mood attributes may include sound characteristics that are associated with particular moods or states such as happy, sad, lively, calm, etc. The system further determines one or more visual mood attributes of each visual media item of a set or cluster of visual media items. In various implementations, the visual characteristics include visual mood attributes associated with particular moods or states as described above (e.g., happy, sad, lively, calm, etc.). The system further selects a soundtrack from the set of soundtracks based on the one or more sound mood attributes and the one or more visual mood attributes. For example, as described in more detail below, the selection criteria may include selecting a soundtrack with sound mood attributes that match the visual mood attributes of the cluster of visual media items. The system further generates an association among the one or more selected soundtracks and the one or more visual media items, wherein the association enables the one or more selected soundtracks to be played while the one or more visual media items are displayed.

Figure 1:
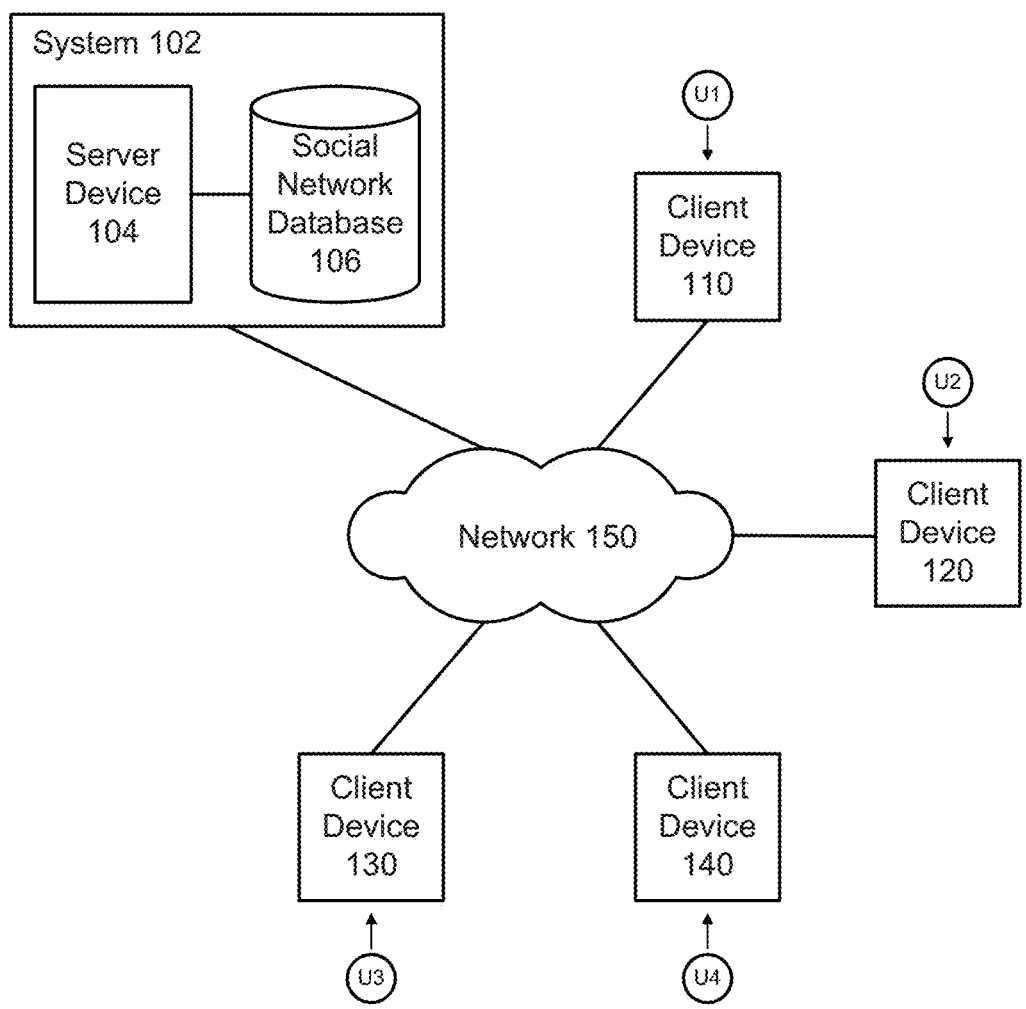
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may use respective client devices 110, 120, 130, and 140 to upload videos to system 102, view videos/movies, and share videos with each other.

In the various implementations described herein, the processor of system 102 causes the elements described herein (e.g., photo slideshows, movies/videos and accompanying soundtracks, etc.) to be played in a user interface on one or more user devices.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc. Implementations may be implemented in a mobile application, in hardware and/or software, or as a server-side service.

Figure 2:
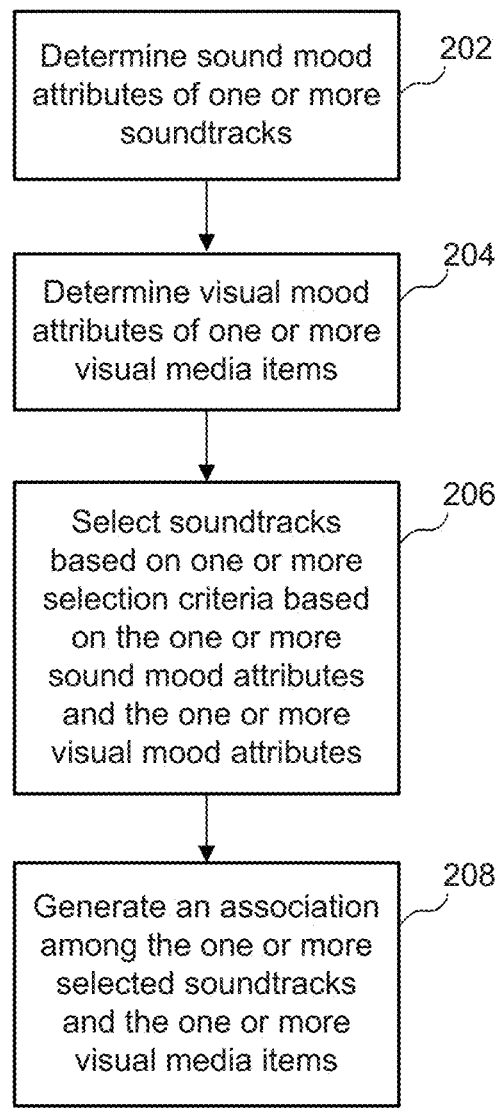
FIG. 2 illustrates an example simplified flow diagram for selecting soundtracks, according to some implementations.

FIG. 2 illustrates an example simplified flow diagram for selecting soundtracks, according to some implementations. Referring to both FIGS. 1 and 2, a method is initiated in block 202, where system 102 determines one or more sound mood attributes of one or more soundtracks, where each sound mood attribute is based on one or more sound characteristics. Example sound mood attributes and associated sound characteristics are described in more detail below in connection with FIG. 3.

Figure 3:
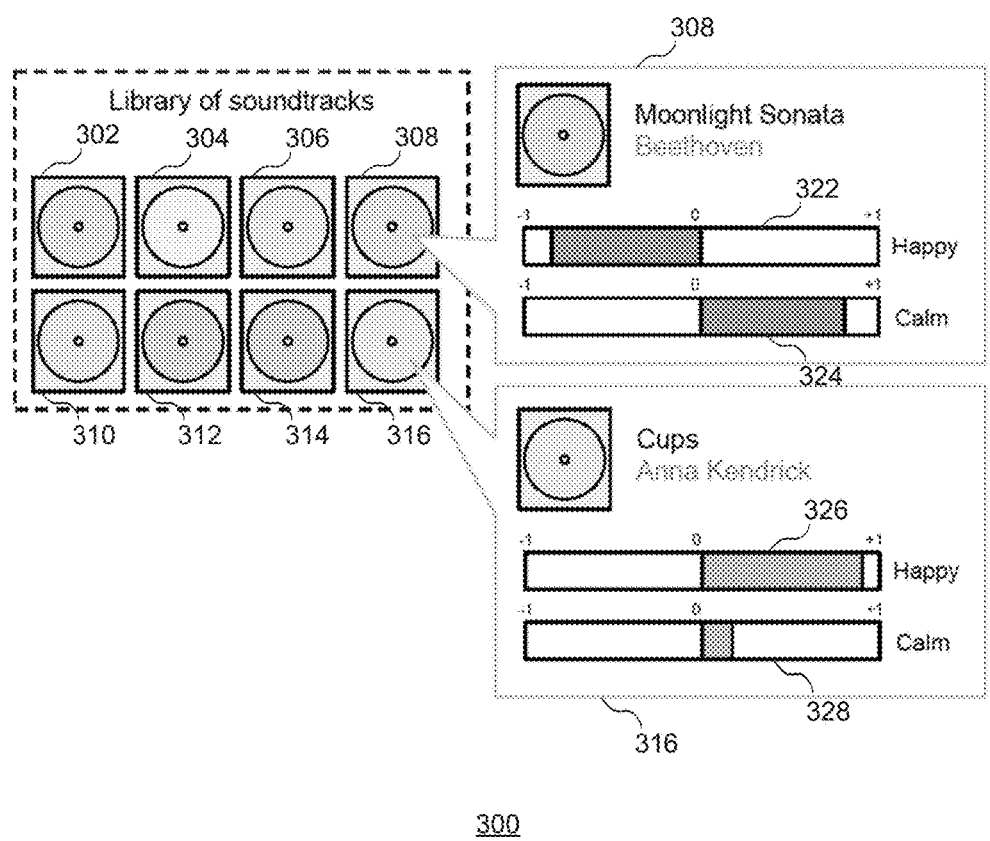
FIG. 3 illustrates an example set of soundtracks, according to some implementations.

FIG. 3 illustrates an example set 300 of soundtracks, according to some implementations. In some implementations, set 300 may be a library of soundtracks. As shown, set 300 includes soundtracks 302, 304, 306, 308, 310, 312, 314, and 316. For ease of illustration, 8 soundtracks are shown. Set 300 may include any number of soundtracks (e.g., hundreds, thousands, etc.).

In some implementations, system 102 accesses a library of soundtracks. In various implementations, system 102 associates each soundtrack with one or more sound mood attributes, and associates each soundtrack with one or more sound mood attribute values. In various implementations, a sound mood attribute value indicates to an intensity of a given mood. Also, as described in more detail below, sound mood attribute values are used to select one or more of the soundtracks to be played with one or more visual media items. As described in more detail below, system 102 associates each soundtrack with a sound mood attribute value based on one or more of the sound characteristics. System 102 stores one or more sound mood attributes and sound mood attribute values for each soundtrack in any appropriate storage location.

In various implementations, the sound mood attributes may be based on sound characteristics that are associated with particular moods. Such sound mood attributes may have labels similar to various emotions, states, etc. For example, sound mood attributes may include emotional labels such as happy, sad, etc. Sound moods attributes may also include other state labels such as lively, calm, etc. For ease of illustration, various implementations are described herein in the context of happy, sad, lively, and calm. These implementations and others also apply to other emotions, feelings, states, etc., depending on the particular implementation.

In some implementations, system 102 may automatically determine one or more sound mood attributes using an algorithm, such as a learning algorithm. For example, in some implementations, system 102 may analyze the sounds of a particular soundtrack. System 102 then determines various sound characteristics of the sounds. Such sound characteristics may include, for example, the music key (or "key"), the tempo, volume, etc. Other sound characteristics are possible, depending on the particular implementation. For example, sound characteristics may also include the music mode (or "mode"), the rhythm, cadence, melody, chords, etc. In some implementations, sound characteristics may also include other characteristics such as lyrics. Example implementations directed to lyrics are described in more detail below.

In some implementations, sound characteristics may include timbre and/or sound production. In various implementations, system 102 may associate different types of voices and musical instruments (e.g., string instruments, wind instruments, and percussion instruments, etc.) with different sound mood attributes. For example, system 102 may associated flute sounds with happy, cello sounds with sad, etc. The particular sound mood attribute associated with a particular instrument may vary and will depend on the particular implementation.

System 102 then determines one or more sound mood attributes based on the sound characteristics. For example, in some implementations, system 102 may analyze a given soundtrack and determine that the pitches of the soundtrack are played in a minor key. System 102 may associate minor keys with sadness. As such, system 102 may determine and tag in metadata the soundtrack as having a sound mood attribute that is sad. In another example, system 102 may analyze a given soundtrack and determine that the tempo is fast. System 102 may associate fast tempos with happiness. As such, system 102 may determine and tag the soundtrack as having a sound mood attribute that is happy.

In some implementations, a particular association between a sound characteristic and a sound mood attribute (e.g., minor key to sad, major key to happy, fast tempo to happiness, etc.) may be predetermined and stored in tags. In some implementations, in addition to automatically determining and tagging one or more sound mood attributes using an algorithm, system 102 may also determine one or more sound mood attributes based on user-provided tags. System 102 enables a user to tag a given soundtrack with one or more sound mood attributes.

In various implementations, for each soundtrack, in addition to determining general labels indicating one or more sound mood attributes (e.g., happy, sad, etc.), system 102 may also determine a sound mood attribute value for each sound mood attribute. As described in more detail below, each sound mood attribute value corresponds to a mood dimension or axis.

Referring still to FIG. 3, in various implementations, system 102 may associate one or more sound mood attributes and corresponding sound mood attribute values with one or more positions on corresponding mood axes or dimensions. For example, as shown, system 102 may associate soundtrack 308 (Moonlight Sonata by Beethoven) with a sound mood attribute and sound mood attribute value on a sad-to-happy axis 322 (labeled "Happy"). As shown, sad-to-happy axis 322 indicates a particular sound mood attribute value (e.g., happy=−0.8). In various implementations, system 102 may use two or more axes or dimensions: happiness vs. sadness, calmness vs. liveliness, etc. System 102 may map sound mood attribute values onto the axes showing happiness vs. sadness, calmness vs. liveliness, etc.

In some implementations, a sound mood axis or dimension may be associated with multiple different sound mood attributes and corresponding sound mood attribute values, as shown in FIG. 3. For example, referring to soundtrack 308, axis 322 may indicate both happy and sad sound mood attributes, even though axis 322 is labeled Happy. In this particular implementation, a negative sound mood attribute value for happy indicates an opposite mood, here sad. In some implementations, system 102 may provide an axis for each sound mood attribute. For example, there may be a happy axis and a separate sad axis.

In various implementations, system 102 may associate soundtrack 308 with multiple sound mood attributes and sound mood attribute values. For example, lively-to-calm axis 324 (labeled "Calm") indicates another particular sound mood attribute value (e.g., calm=+0.8) for soundtrack 308. As such, soundtrack 308 may be considered both sad and calm music.

In another example, system 102 may associate soundtrack 316 (Cups by Anna Kendrick) with different sound mood attribute values (e.g., happy=+0.9, calm=+0.2, etc.) on a sad-to-happy axis 326 and on a lively-to-calm axis 328. As such, soundtrack 316 may be considered happy and somewhat calm music.

For ease of illustration, two sound mood attributes are shown for each soundtrack. These implementations and others apply to any number of sound mood attributes. In some implementations, each soundtrack may be tagged with a sound mood attribute values alone (e.g., moonlight sonata: sad, calm, etc.), rather than with both a sound mood attribute and a sound mood attribute value on an mood dimension or scale (e.g., moonlight sonata: happy=−0.8, calm=+0.8, etc.). The moods described herein are examples, and others are possible depending on the particular implementation.

The particular sound characteristic used to determine a particular sound mood attribute and particular sound mood attribute value may vary and will depend on the particular implementation. In various implementations, system 102 may determine a particular sound mood attribute and a particular sound mood attribute value based on a combination of different sound characteristics. System 102 may base a sound mood attribute on a combination of any one or more of the music key, the mode, the tempo, the rhythm, volume, etc. For example, system 102 may determine that a soundtrack is in a minor key, slower tempo, lower volume, and then associate the soundtrack with a sad sound mood attribute based on those sound characteristics.

In various implementations, system 102 may use a particular sound characteristic to determine different sound mood attributes. For example, if a given soundtrack has a fast tempo (e.g., +120 beats per minute), system 102 may associate the soundtrack with a happy sound mood attribute and a lively sound mood attribute. In other words, system 102 may determine multiple sound mood attributes (e.g., happiness, liveliness, etc.) based on the same sound characteristic (e.g., tempo, etc.).

In various implementations, the sound mood attribute value is based on relative sound characteristics. For example, if system 102 associates a fast tempo with liveliness, system 102 may associate a larger sound mood attribute value (e.g., liveliness=+0.8) to a soundtrack with a relatively faster tempo (e.g., +120 beats per minute), whereas system 102 may associate a smaller sound mood attribute value (e.g., liveliness=+0.2) to a soundtrack with a relatively slower tempo (e.g., +100 beats per minute). System 102 may further associate an even smaller sound mood attribute value (e.g., liveliness=−0.4) to a soundtrack with a relatively slower tempo (e.g., +50 beats per minute).

In some implementations, where system 102 associates a sound mood attribute value (e.g., happiness) with a soundtrack based on multiple sound characteristics (e.g., key, tempo, etc.), system 102 may determine a total sound mood attribute value based on a combination of separate sound mood attribute values. For example, in some implementations, system 102 may determine a sound mood attribute value based on an average of the separate sound mood attribute values.

In some implementations, system 102 may determine a given sound mood attribute value, wherein the sound mood attribute value is based on a weighted average of separate sound mood attribute values. For example, if a happiness sound mood attribute is based on music key and tempo sound characteristics, system 102 may associate a higher weight to the key sound mood attribute value and a lower weight to the tempo sound mood attribute value. In another example, if a liveliness sound mood attribute value is based on tempo and volume sound characteristics, system 102 give a higher weight to the tempo sound mood attribute value and a lower weight to the volume sound mood attribute value. The actually weighting of a sound mood attribute value will vary and will depend on the particular sound characteristic and particular sound mood attribute. For example, a tempo sound characteristic may be more relevant than a volume sound characteristic in the context of a liveliness sound mood attribute. As such, the sound mood attribute value may be weighted higher for tempo than for volume.

In some implementations, a given soundtrack may have sound mood attribute values that change over time (e.g., over different portions of the soundtrack). For example, the bridge of a song may have a different sound mood attribute value than the chorus and/or verse. In some implementations, system 102 may determine a sound mood attribute value for the soundtrack based on an average of the sound mood attribute values over the entire soundtrack. For example, if the chorus and verse portions have a sound mood attribute value of happy=+0.8 and the bridge portion has a sound mood attribute value of happy=+0.4, the average would be a sound mood attribute value of happy=+0.6. The actual average may depend on how the different portions are weighted (e.g., proportionally by length, etc.), which will depend on the particular implementation. In some implementations, system 102 may truncate a give portion of a soundtrack that deviates from other portions beyond a predetermined threshold (e.g., greater than 0.5) so that the mood of the soundtrack better matches the mood of the visual media item(s). In some implementations, system 102 may simply not select a particular soundtrack where one or more portions of the soundtrack deviates from other portions beyond a predetermined threshold. The predetermined threshold may vary and will depend on the particular implementation.

As described in more detail below, system 102 compares these sound mood attribute values to visual mood attribute values of visual media items and then selects one or more soundtracks to be played with those visual media items.

In block 204, system 102 determines one or more visual mood attributes of one or more visual media items, where each visual mood attribute is based on one or more visual characteristics. Example implementations of visual characteristics and visual mood attributes are described in more detail below.

In various implementations, the visual mood attributes may be based on visual characteristics that are associated with particular moods. Similar to sound mood attributes described herein, visual mood attributes may have labels similar to various emotions, states, etc. For example, visual mood attributes may include emotional labels such as happy, sad, etc. Visual moods attributes may also include other state labels such as lively, calm, etc. For ease of illustration, various implementations are described herein in the context of happy, sad, lively, and calm. These implementations and others also apply to other emotions, feelings, states, etc., depending on the particular implementation.

Figure 4:
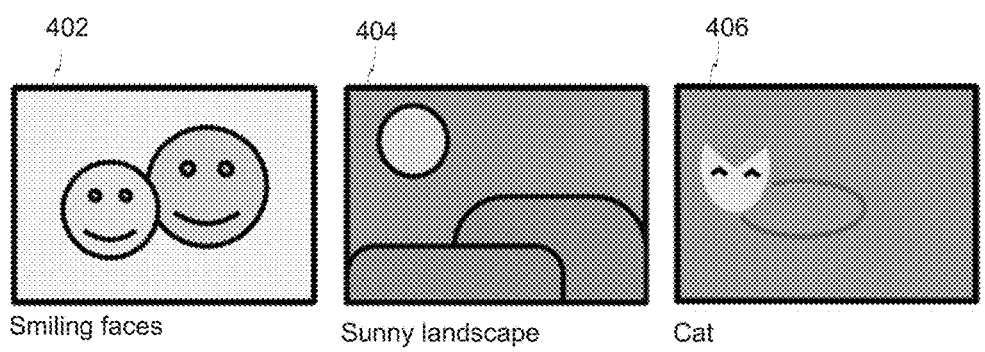
FIG. 4 illustrates an example set of visual media items having visual mood attributes that are happy, according to some implementations.

FIG. 4 illustrates an example set 400 of visual media items having visual mood attributes that are happy, according to some implementations. Set 400 includes a photo 402, a photo 404, and a photo 406. In various implementations, system 102 determines the visual characteristics of each of the photos using any suitable recognition algorithm. Example implementations of recognition algorithms are described in more detail below. For ease of illustration, various implementations are described herein in the context of photos. These implementations and others also apply to other types of visual media such as video. For example, implementations in connection with photos described herein may also apply to individual frames of a video. In some implementations, system 102 may sample frames of a given video in order to determine one or more visual mood attributes and one or more visual mood attribute values of the video.

As shown, the visual characteristics of photos 402, 404, and 406 include visual mood attributes. For example, photo 402 shows smiling faces, a photo 404 shows a sunny landscape, and photo 406 shows a cat. These visual characteristics (e.g., smiling faces, sunny landscape, a cat, etc.) are typically associated with a happy mood.

In various implementations, system 102 may utilize object recognition and/or face recognition to associate visual characteristics with visual mood attributes. For example, system 102 may use object and/or face recognition to recognize a smile on a face, the sun, particular colors (e.g., bright colors, etc.), particular animals (e.g., kittens, puppies, penguins, etc.) and associate these objects with a happy visual mood attribute. In another example, system 102 may use object and/or face recognition to recognize a frown on a face, a grave stone, particular colors (e.g., dark colors, etc.), and associate these objects with a sad visual mood attribute. Other associations are possible, depending on the particular implementation.

In some implementations, system 102 may automatically determine one or more visual attributes using an algorithm, such as a recognition algorithm. Example implementations of recognition algorithms are described in more detail below. In various implementations, system 102 detects one or more objects in each photo. System 102 may recognize one or more of the objects each photo. System 102 then analyzes the visual characteristics of each photo. As described in more detail herein, in various implementations, the visual characteristics may include types of content aspects such as objects and may also image aspects. For example, object aspects may include faces, facial objects such as smiles, etc. Object aspects may also include the number of objects, as well as contextual text information. Image aspects may include dynamic range, including blurriness, brightness, contrast, etc. Example implementations are described in more detail below. For example, system 102 may recognize a smile on one or more faces as shown in photo 402. System 102 may also recognize a sun and/or beautiful landscaping as shown photo 404. System 102 may also recognize a pet as shown in photos 406. In various implementations, system 102 may associate such objects and others with happiness. System 102 then determines one or more of the visual mood attributes based on the visual characteristics. In various implementations, system 102 identifies the content of photos 402, 404, and 406 as happy content. For example, in these examples shown in FIG. 4, system 102 may associate a visual mood attribute to be happy. While these steps are described in the context of a happy visual mood attribute, these steps and others also apply to other moods. For example, photos with a sad visual mood attribute are described below in connection with FIG. 5. As described in more detail below, system 102 selects a soundtrack with bias towards tracks with a high happiness rating.

Figure 5:
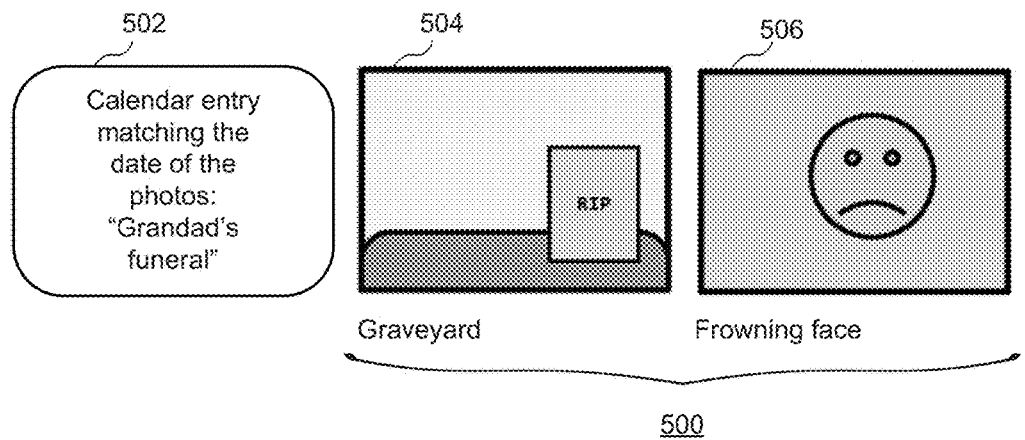
FIG. 5 illustrates an example calendar entry and set of visual media items having visual mood attributes that are sad, according to some implementations.

FIG. 5 illustrates an example calendar entry and set of visual media items having visual mood attributes that are sad, according to some implementations. FIG. 5 shows a calendar entry 502, a photo 504, and a photo 506. In various implementations, system 102 may determine visual characteristics of each of the photos using any suitable recognition algorithm. Example implementations of recognition algorithms are described in more detail below.

In some implementations, system 102 may automatically determine one or more visual attributes using an algorithm, such as a recognition algorithm. In various implementations, system 102 detects one or more objects in each photo. System 102 may recognize one or more of the objects each photo. For example, photo 504 shows a graveyard, and photo 506 shows a sad face. System 102 then analyzes any recognized objects and analyzes other aspects of each photo in order to determine visual characteristics. For example, these visual characteristics (e.g., a graveyard, a sad face, etc.) are typically associated with a sad mood. In various implementations, system 102 identifies the content of photos 504 and 506 as sad visual characteristics. As such, in various implementations, system 102 may associate such objects and others with sadness. System 102 then determines one or more visual mood attributes based on the visual characteristics. For example, system 102 may determine the visual mood attribute to be sad. As described in more detail below, system 102 selects a soundtrack with bias towards tracks with a low happiness rating (or with a high sad rating).

In some implementations, system 102 may determine visual characteristics of each of the visual media items in a variety of ways. For example, in some example implementations, system 102 may determine the visual characteristics of each of the photos using any suitable recognition algorithm. In some implementations, system 102 may determine visual characteristics based on speech from the original audio of a video media item. For example, the tone of a speaker in the video may be happy or sad.

In some implementations system 102 may determine visual characteristics of each of the photos based on analyzing a calendar system. For example, system 102 may determine that photo 504 of a graveyard was taken on a particular date. System 102 may also determine from calendar entry 502 of a calendar system that a funeral (sad event) occurred on the same particular date. System 102 may use calendar entry 502 to match the date of photo 504 and/or the date of other photos as data to determine the visual mood attribute (e.g., sad). System 102 may also match the owner of the calendar entry with the owner of the photo to further correlate the calendar entry and photo. For example, system 102 may determine that the same user who made the calendar entry 502 of a funeral is the same user who uploaded photo 504 of a graveyard. System 102 may use such information, and some date correlation, to determined that the photo of the graveyard is associated with the funeral. In other words, system 102 may verify that photo 504 is associated with a sad moment, a funeral. While this example use of a calendar entry is described in the context of a sad visual mood attribute, system 102 may use calendar entries to determine other visual mood attributes (e.g., happy, calm, lively, etc.).

In another example implementation, if system 102 finds "birthday party" in a calendar entry, and the calendar date was at the time the visual media was captured, the visual media are likely to represent a happy event. System 102 may then move toward classifying the media as "happy" based on the assumption they were taken at that event.

As indicated herein, in various implementations, each visual characteristic may be associated with a predetermined visual mood attribute. For example, system 102 may detect facial expressions and associate detected facial expressions with particular moods, where a smile may be associated with happy, a frown may be associated with sad, etc. System 102 may detect objects and associate the detected objects with particular moods (e.g., a balloon, or a pet such as a cat may be associated with happy, a gravestone may be associated with sad, etc.). A landscape may be associated with calm. Waves at the beach may be associated with lively. These are some examples, and others are possible, depending on the particular implementations.

As indicated above, in addition to particular objects, system 102 may also analyze various non-content image aspects of a given photo in order to determine one or more visual mood attributes. For example, system 102 may compare the colors in a given visual media item to a color histogram, where each color is associated with a mood. System 102 may associate dark or grey colors with a sad mood, etc. System 102 may associate bright colors such as yellow colors and bright sky blues with a happy mood, etc. In addition to color, other image aspects may include brightness, contrast, composition, etc.

As indicated herein, in various implementations, system 102 may automatically learn some associations between visual characteristics and visual mood attributes using a recognition algorithm and/or learning algorithm. In some implementations, system 102 may receive some associations between visual characteristics and visual mood attributes from one or more users (e.g., in tags, etc.). In some implementations, system 102 may analyze facial expressions. Photos and videos where the subject is smiling will register as happy, while frowns will register as sad.

In some implementations, system 102 may analyze the subject or content of the visual media. For example, some photos may already be associated with annotations such as "cat," "Paris," "sky," etc. System 102 may correlate such annotations with moods. For example, cat videos are more likely to be happy, while graveyard videos are more likely to be sad.

In some implementations, where a visual media item is a video, system 102 may utilize motion detected in videos to determine visual mood attributes. For example, on a calm versus lively axis, motion may push the cluster of media towards the "lively" pole, whereas a lack of motion may push towards the "calm" pole. Such camera motion may be detected with accelerometers, or the change in position over time detected using a global positioning system (GPS), etc.

In some implementations, system 102 may determine visual mood attribute values for some visual mood attributes, where the visual mood attribute values are based on a combination of visual characteristics described herein. For example, in various implementations, system 102 may combine various types of data in order to determine visual attributes values. In some implementations, system 102 may use a set of linear models to give a value on each of the emotional axes specified. For example, a photo of a birthday party with racing go karts might register as +1 on the sad-to-happy scale and −1 on the lively-to-calm scale (e.g., happy and lively).

In various implementations, other data could be used (qualities of the photos or videos, data about the user, local news from the date/time the media were captured, etc. System 102 may combine data in a variety of ways (e.g., linear models, neural networks, hand-coded heuristics, etc.).

Similar techniques for determining sound mood attribute values described herein may also be used to determine visual mood attribute values. For example, in some implementations, where system 102 associates a visual mood attribute (e.g., happiness) with a visual media item based on multiple visual characteristics (e.g., content aspects, image aspects, etc.), system 102 may determine a total visual mood attribute value based on a combination of separate visual mood attribute values. For example, in some implementations, system 102 may determine a visual mood attribute value based on an average of the separate visual mood attribute values.

In some implementations, system 102 may determine a given visual mood attribute value, wherein the visual mood attribute value is based on a weighted average of separate visual mood attribute values. For example, system 102 may associate a higher weight to a smile on a face and a lower weight to a tree, even though both may have positive, happy associations. The actually weighting of a visual mood attribute value will vary and will depend on the particular visual characteristic and particular visual mood attribute.

For ease of illustration, some example implementations herein are described in the context of happy and sad visual mood attributes. However, these example implementations and others may also apply to other visual mood attributes such as calm, lively, etc., depending on the particular implementations.

Referring again to FIG. 2, in block 206, where system 102 selects one or more of the soundtracks from a set of soundtracks based on the one or more sound mood attributes and the one or more visual mood attributes. As described in more detail below, system 102 selects soundtracks that have one or more sound mood attributes that correspond to one or more visual mood attributes of visual media items.

In various implementations, system 102 selects one or more soundtracks for a given set of visual media items based on one or more selection criteria. In some implementations, selection criteria may include system 102 selecting one or more soundtracks having one or more sound mood attributes that correspond to or match to one or more visual mood attributes of the one or more visual media items. For example, sound tracks with happy sound mood attributes would be appropriate for visual media items having happy visual mood attributes (e.g., playful music for a birthday party, etc.). In another example, sound tracks with sad sound mood attributes would be appropriate for visual media items having sad visual mood attributes (e.g., somber music at a funeral, etc.).

In some implementations, selection criteria may include selecting a variety of soundtracks. For example, system 102 may select a variety of soundtracks so that movies produced have variety of music so that viewers stay interested. In some implementations, the variety of soundtracks may include soundtracks with varying music styles (e.g., classical, pop, rock, jazz, etc.). In some implementations, the variety of soundtracks may include soundtracks having various elements (e.g., voice, instruments, effects, etc.). This generally provides a large set of soundtracks to be played with the visual media.

Figure 6:
FIG. 6 illustrates an example diagram for selecting soundtracks, according to some implementations.

FIG. 6 illustrates an example diagram 600 for selecting soundtracks, according to some implementations. In some implementations, diagram 600 includes various axes, where each axis is associated with a range of moods. For example, diagram 600 includes an x-axis 602 that represents a sad-to-mood happy mood range. Diagram 600 also includes a y-axis 604 that represents a lively-to-calm mood range. These axes may be referred to as emotional axes or mood axes. In some implementations, the combination of mood axes provides mood quadrants, where a mood quadrant represents a combination of moods. For example, the upper left quadrant represents a degree of sadness and calmness. The upper right quadrant represents a degree of happiness and calmness. The lower left quadrant represents a degree of sadness and liveliness. The lower right quadrant represents a degree of happiness and liveliness.

In various implementations, system 102 positions soundtracks and sets of visual media items in diagram 600 based on their sound mood attributes. As described in more detail below, system 102 randomly selects soundtracks appropriate to a given set of visual media items. For example, system 102 would select music with action (e.g., lively music) for visual footage with action (e.g. video footage of a soccer game, etc.). System 102 would select calm music for slow moving visual footage (e.g., shots of landscapes). System 102 would select happy music for special happy events such as birthday parties and other celebrations. In other words, system 102 selects songs that represent or reflect the moment(s) displayed visually.

In various implementations, each soundtrack has a value on each emotional axis. For example, referring to point 606 in diagram 600, Moonlight Sonata by Beethoven, may have value of −0.8 on the sad-to-happy axis, where a negative number represents a weighting in the sad direction of the axis, and where a positive number represents a weighting in the happy direction of the axis. As such, an −0.8 would be considered sad.

Moonlight Sonata may have value of +0.8 on the lively-to-calm axis, where a negative number represents a weighting in the lively direction of the axis, and where a positive number represents a weighting in the calm direction of the axis. As such, an +0.8 would be considered calm. As a result, Moonlight Sonata would be considered sad and calm.

These conventions and orientations are examples, and others are possible, depending on the particular implementation. For example, a negative number could represent a weighting in the calm direction of the axis, and where a positive number could represent a weighting in the lively direction of the axis.

In another example, referring to point 608 in diagram 600, the song Cups by Anna Kendrick, may have value of +0.9 on the sad-to-happy axis, which would be considered happy. Cups may have a value of +0.2 on the lively-to-calm axis, which would be considered somewhat calm. As a result, Cups would be considered happy and somewhat calm.

In some implementations, a given soundtrack or visual media item may not necessarily be positioned along a given axis in a binary fashion. For example, a given soundtrack may be a birthday song or not (e.g., either yes or no). As such, system 102 may select a birthday song for a birthday visual media item regardless of the mood axes.

In various implementations, system 102 positions sets of visual media items on diagram 600 in a similar fashion as positioning soundtracks. In other words, each set or cluster of visual media (photos or videos, etc.) also has a valuation.

In various implementations, system 102 may randomly select a soundtrack that matches the mood or emotional content of a visual media cluster as follows:

$$P(\text{Soundtrack } S_i \text{ is selected}) = \frac{W(S_i, C)}{\sum_k W(S_k, C)}.$$

P is the probability that a particular soundtrack $S_i$ is selected for a given set or cluster of visual media items C. $S_i$ represents the soundtrack with index i. C represents the class of visual media items (e.g., photos, videos, etc. in a cluster). W represents a weight and is dependent on the distance from the position of the soundtrack $S_i$ to the position assigned to the cluster C (e.g., in diagram 600). For example, if cluster C is close to Moonlight Sonata, W will be higher. As such, system 102 is more likely to select/assign Moonlight Sonata to the cluster C. In other words, the cluster C being in the same quadrant as soundtrack $S_i$ in that quadrant will increase the probability of system 102 selecting soundtrack $S_i$. Accordingly, selection is randomized but with weights.

In various implementations, the probability P that a particular soundtrack $S_i$ is selected for a given set or cluster of visual media items C is obtained by dividing the weight W of a given soundtrack by the sum of the weights of all available soundtracks. For example, assuming there are 3 soundtracks, where one soundtrack has a weight of 3, one soundtrack has a weight of 1, and one soundtrack has a weight of 0. The soundtrack having a weight of 3 would have a 3/4 chance of being selected. The soundtrack having a weight of 1 would have a 1/4 chance of being selected. The soundtrack having a weight of 0 would have a 0/4 chance of being selected.

The following equation describes how a particular weight may be determined:

$$W(S_i, C) = \frac{1}{d(S_i, C) + K}$$

In some implementations, d is a distance from the position of the soundtrack $S_i$ to the position assigned to the cluster C (e.g., in diagram 600). In some implementations, a cluster C may represent the soundtracks in one quadrant. In some implementations, a cluster C may also represent soundtracks having sound mood attribute values falling within a predetermined range of each other (e.g., close in value). K is constant.

In various implementations, the weight for a given soundtrack is based on the distance. For example, when the distance is small, the weight is large. In other words, when the soundtrack is close in value and/or in distance to the cluster of media, the weight is high, indicating a good fit between the soundtrack and the cluster of visual media. When the soundtrack is close in value to the cluster of visual media, the weight is low, indicating a poor fit.

In various implementations, if the constant K is larger, it would increase the chance of system 102 selecting soundtracks that are further away in value and/or distance from the media cluster. This would be good for the purpose of variety in soundtrack selection. If there are a large number of soundtracks (e.g., thousands, etc.), a smaller constant K would narrow the selection of soundtracks.

The following equation describes how a distance may be determined:

$$d(S_k, C) = \sqrt{\sum_j (S_{kj} - C_j)^2}.$$

Distance d is a standard Euclidian distance. For example, the distance d may be measured with a ruler between the value for the soundtrack and the value for the media cluster. The distance d is the square root of summation of $(S_{kj}-C_j)^2$ over j. The variable j represents range of the summation over the axes (e.g., sad-to-happy axis and lively-to-calm axis). Conceptually, the distance d is the distance between the "feel" of the soundtrack and the feel of the visual media cluster. In some implementations, system 102 may receive the distance d from a user. In some implementations, system 102 may automatically determine the distance d using any suitable algorithm. As such, in some implementation, system 102 may filter candidate soundtracks such that the sound mood attribute values of those soundtracks and the visual mood attribute values of the visual media items are close in range. For example, the sound mood attribute values of those soundtracks and the visual mood attribute values may be less than a predetermined threshold apart from each other (e.g., less than 0.3). The particular threshold may vary and will depend on the particular implementation.

In some implementations, system 102 may enable the user to indicate manually what emotions they wish the music accompanying the video media items to convey. For example, system 102 may provide a button for the user, where the user can tap on keywords like "happy" or select positions on emotional axes manually. In another example, system 102 may measure soundtracks on multiple axes and may associate soundtracks with different visual moods, as well. For example, system 102 may characterize a song like Taps as relatively calm and sad as well as patriotic and hopeful, for instance. As such, system 102 may use various different types of sound mood attributes (e.g., patriotic, hopeful, etc.) in addition to those referred to herein. In some implementations, system 102 may also analyze lyrics and song titles of songs for words that indicate mood. As such, system 102 may determine sound mood attributes and as well as sound mood attributes values based on song lyrics, including song titles. In some implementations, system 102 may also determine the composer of a given soundtrack or song and determine whether to associate one or more sound mood attributes based on the composer. For example, a particular composer may be known to compose soundtracks or songs of particular moods.

Referring again to FIG. 2, in block 208, system 102 generates an association among the one or more selected soundtracks and the one or more visual media items. In various implementations, the association enables the one or more selected soundtracks to be played while the one or more visual media items are displayed. As indicated above, system 102 selects appropriate soundtracks to be played along with particular clusters of visual media (e.g., photos, videos, etc.). Such a presentation may be in the form of a slideshow or a movie that users can view.

In some implementations, system 102 may group a set of visual media items together based on a common visual mood attribute. As such, system 102 may select soundtracks having a common sound mood attribute corresponding to the common visual mood attribute of the set of visual media items. In various implementations, system 102 may group a set of visual media items together in various ways (e.g., in a slideshow, movie, photo album, etc.), depending on the particular implementation. As such, system 102 enables the selected soundtracks to be played with the set of visual media items, where the sound and visual mood attributes match.

In some implementations, system 102 may group a set of visual media items together based on tags. For example, a particular group of visual media items be grouped by an event such as a birthday party. In some scenarios, different visual media items may have different visual mood attributes (e.g., happy, lively, calm, etc.). In some implementations, when the visual media items are played together (e.g., in a slideshow, movie, etc.), system 102 causes the soundtracks selected to be played to automatically switch to soundtracks with an appropriate sound mood attribute corresponding to the visual mood attribute of the visual media item currently being presented.

In some implementations, system 102 may determine how soundtracks transition from one soundtrack to another. For example, in some implementations, a soundtrack being played may fade out as the next soundtrack fades in. In some implementations, a soundtrack may switch to a new soundtrack on a common beat. The particular transition style may vary and will depend on the particular implementation. In some implementations, system 102 may also enable a user to select a transition style.

In some implementations, system 102 need not necessarily play selected soundtracks with a given set of visual media items. For example, in some implementations, system 102 may provide associations between selected soundtracks and one or more visual media items to a separate system (e.g., a third-party system), which can then access and play the selected soundtracks with the one or more visual media items. In some implementations, system 102 may provide a package to the separate system, where the package includes the selected soundtracks and one or more visual media items. The other system may then play the selected soundtracks with the one or more visual media items.

Implementations described herein provide various benefits. For example, implementations described herein provide aesthetically pleasing videos that meet various criteria, utilize all available information to make intelligent selections of soundtracks, while still preserving the randomness required in order to maintain user interest.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize objects, landmarks, etc. in images. Such recognition algorithms may be integral to system 102. System 102 may also access recognition algorithms provided by software that is external to system 102 and that system 102 may access.

In various implementations, system 102 obtains reference images of objects, where each reference image includes an image of an object that is associated with a known object or category of object. The object is known, in that system 102 has the user's identity information such as the object's name and other object information. In some implementations, a reference image may be, for example, an object image that users have uploaded. In some implementations, a reference image may be based on a composite of a group of reference images.

In some implementations, to recognize an object, system 102 may compare the object (e.g., image of the object) and match the object to reference images of the object. Note that the term "object" and the phrase "image of the object" are used interchangeably. For ease of illustration, the recognition of one object is described in some of the example implementations described herein. These implementations may also apply to each object of multiple objects to be recognized.

In some implementations, system 102 may search reference images in order to identify any one or more reference images that are similar to the object in the image. In some implementations, for a given reference image, system 102 may extract features from the image of the object in an image for analysis, and then compare those features to those of one or more reference images. For example, system 102 may analyze the relative position, size, and/or shape of object features such as facial characteristics, body characteristics, etc. In some implementations, system 102 may use data gathered from the analysis to match the object in the image to one more reference images with matching or similar features. In some implementations, system 102 may normalize multiple reference images, and compress object data from those images into a composite representation having information (e.g., object feature data), and then compare the object in the image to the composite representation for facial recognition.

In some scenarios, the object in the image may be similar to multiple reference images associated with the objects in the same category. As such, there would be a high probability that the object associated with the object in the image is the same object associated with the reference images.

In some implementations, to facilitate in object recognition, system 102 may use geometric recognition algorithms, which are based on feature discrimination. System 102 may also use photometric algorithms, which are based on a statistical approach that distills an object feature into values for comparison. A combination of the geometric and photometric approaches could also be used when comparing the object in the image to one or more references.

Other recognition algorithms may be used. For example, system 102 may use recognition algorithms that use one or more of principal component analysis, linear discriminate analysis, elastic bunch graph matching, hidden Markov models, and dynamic link matching. It will be appreciated that system 102 may use other known or later developed recognition algorithms, techniques, and/or systems.

In some implementations, system 102 may generate an output indicating a likelihood (or probability) that the object in the image matches a given reference image. In some implementations, the output may be represented as a metric (or numerical value) such as a percentage associated with the confidence that the object in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a recognition algorithm. Various recognition algorithms and/or visual search systems may be used to recognize objects such as landmarks, logos, entities, events, faces, etc. in order to implement implementations described herein.

Figure 7:
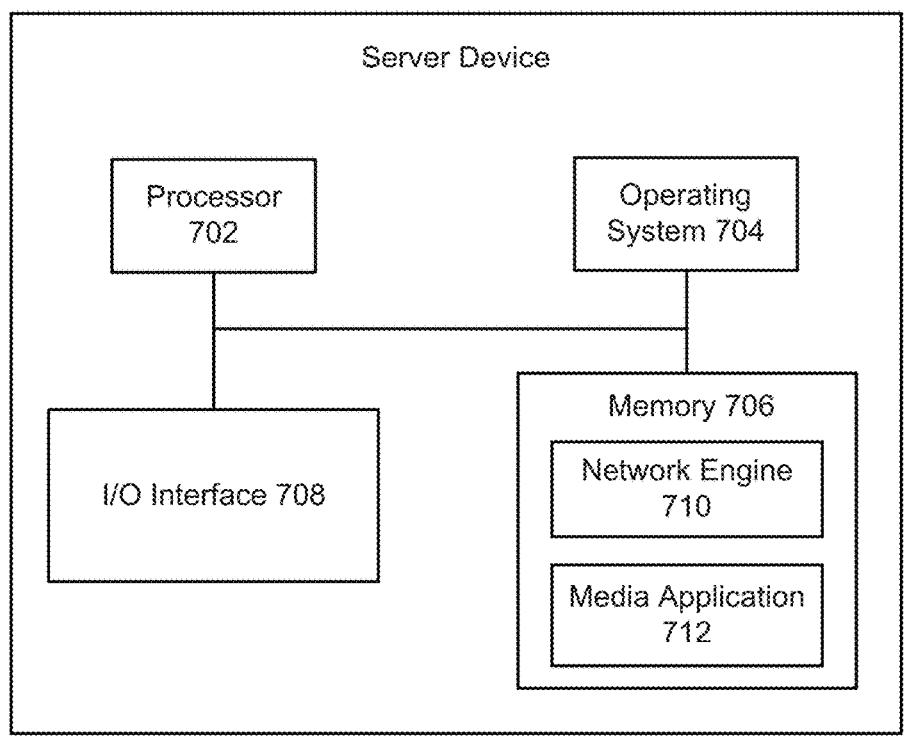
FIG. 7 illustrates a block diagram of an example server device, which may be used to implement the implementations described herein.

FIG. 7 illustrates a block diagram of an example server device 700, which may be used to implement the implementations described herein. For example, server device 700 may be used to implement server device 104 of FIG. 1, as well as to perform the method implementations described herein. In some implementations, server device 700 includes a processor 702, an operating system 704, a memory 706, and an input/output (I/O) interface 708. Server device 700 also includes a network engine 710 and a media application 712, which may be stored in memory 706 or on any other suitable storage location or computer-readable medium. Media application 712 provides instructions that enable processor 702 to perform the functions described herein and other functions.

For ease of illustration, FIG. 7 shows one block for each of processor 702, operating system 704, memory 706, I/O interface 708, network engine 710, and media application 712. These blocks 702, 704, 706, 708, 710, and 712 may represent multiple processors, operating systems, memories, I/O interfaces, social network engines, and media applications. In other implementations, server device 700 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A computer-implemented method comprising:
    determining one or more sound mood attributes of each soundtrack of a set of soundtracks, wherein the one or more sound mood attributes are based on one or more sound characteristics;
    determining, by one or more processors, that one or more visual media items are associated with an event and that the one or more visual media items are associated with one or more visual mood attributes, wherein the one or more visual mood attributes include one or more of a happy visual mood attribute, a sad visual mood attribute, a lively mood attribute, or a calm mood attribute;
    selecting one or more soundtracks of the set of soundtracks based on the one or more sound mood attributes and the one or more visual mood attributes by applying an equation $$P(\text{Soundtrack } S_i \text{ is selected}) = \frac{W(S_i, C)}{\sum_k W(S_k, C)},$$

where P is a probability that a particular soundtrack $S_i$ of the one or more soundtracks is selected for a cluster of visual media items (C), $S_i$ represents the particular soundtrack with index I, and W represents a weight that is dependent on a distance from a first position of the soundtrack $S_i$ to a second position assigned to C;

generating a video or a slideshow that includes the one or more soundtracks and the visual media items; and providing the video or the slideshow to a user.

2. The method of claim 1, wherein the one or more visual media items are determined to be associated with the event by correlating a first date of the event with a second date of capture of the one or more visual media items.

3. The method of claim 1, wherein the method further comprises associating at least one soundtrack with at least one sound mood attribute value.

4. The method of claim 1, wherein one or more of the sound characteristics include one or more of a music key or a tempo.

5. The method of claim 1, wherein the method further comprises:

performing, by the one or more processors, object recognition or facial recognition on the one or more visual media items associated with the event to identify a person or an object in the one or more visual media items and to associate one or more visual characteristics for the person or the object with the one or more visual mood attributes;

wherein the one or more visual mood attributes are based on one or more of the visual characteristics, and wherein one or more of the visual characteristics include one or more of content aspects or image aspects.

6. The method of claim 1, wherein determining that the one or more visual media items are associated with the event is based on analyzing a calendar system.

7. The method of claim 1, wherein the method further comprises determining at least one sound mood attribute value for at least one of the sound mood attributes, wherein the at least one sound mood attribute value is used to select the one or more soundtracks, and wherein the at least one sound mood attribute value is based on a weighted average of separate sound mood attribute values that describe multiple sound characteristics.

8. A non-transitory computer-readable storage medium carrying program instructions thereon, the instructions when executed by one or more processors cause the one or more processors to perform operations comprising:

determining one or more sound mood attributes of each soundtrack of a set of soundtracks, wherein the one or more sound mood attributes are based on one or more sound characteristics;

determining that one or more visual media items are associated with an event and that the one or more visual media items are associated with one or more visual mood attributes, wherein the one or more visual mood attributes include one or more of a happy visual mood attribute, a sad visual mood attribute, a lively mood attribute, or a calm mood attribute;

selecting one or more soundtracks of the set of soundtracks based on the one or more sound mood attributes and the one or more visual mood attributes by applying an equation $$P(\text{Soundtrack } S_i \text{ is selected}) = \frac{W(S_i, C)}{\sum_k W(S_k, C)},$$

where P is a probability that a particular soundtrack $S_i$ of the one or more soundtracks is selected for a cluster of visual media items (C), $S_i$ represents the particular soundtrack with index I, and W represents a weight that is dependent on a distance from a first position of the soundtrack $S_i$ to a second position assigned to C;

generating a video or a slideshow that includes the one or more soundtracks and the visual media items; and enabling the video or the slideshow.

9. The computer-readable storage medium of claim 8, wherein the instructions further cause the one or more processors to perform operations comprising determining at least one sound mood attribute value for at least one of the sound mood attributes, wherein the at least one sound mood attribute value indicates to an intensity of mood, and wherein the at least one sound mood attribute value is used to select the one or more soundtracks.

10. The computer-readable storage medium of claim 8, wherein the instructions further cause the one or more processors to perform operations comprising associating at least one soundtrack with at least one sound mood attribute value, and wherein the at least one sound mood attribute value is based on one or more of the sound characteristics.

11. The computer-readable storage medium of claim 8, wherein one or more of the sound characteristics include one or more of a music key or a tempo.

12. The computer-readable storage medium of claim 8, wherein the instructions further cause the one or more processors to perform operations comprising:

performing object recognition or facial recognition on the one or more visual media items associated with the event to identify a person or an object in the one or more visual media items and to associate one or more visual characteristics for the person or the object with the one or more visual mood attributes;

wherein the one or more visual mood attributes are based on one or more of the visual characteristics, and wherein one or more of the visual characteristics include one or more of content aspects or image aspects.

13. The computer-readable storage medium of claim 8, wherein the selecting of the one or more soundtracks comprises determining the one or more soundtracks having one or more sound mood attributes that correspond to one or more visual mood attributes of the one or more visual media items.

14. The computer-readable storage medium of claim 8, wherein the instructions further cause the one or more processors to perform operations comprising determining at least one sound mood attribute value for at least one of the sound mood attributes, wherein the at least one sound mood attribute value is used to select the one or more soundtracks, and wherein the at least one sound mood attribute value is based on a weighted average of separate sound mood attribute values that describe multiple sound characteristics.

15. A system comprising:

one or more processors; and logic encoded in one or more tangible media for execution by the one or more processors and when executed operable to perform operations comprising:

determining one or more sound mood attributes of each soundtrack of a set of soundtracks, wherein the one or more sound mood attributes are based on one or more sound characteristics;

determining that one or more visual media items are associated with an event and that the one or more visual media items are associated with one or more visual mood attributes;

selecting one or more soundtracks of the set of soundtracks based on the one or more sound mood attributes and the one or more visual mood attributes by applying an equation $$P(\text{Soundtrack } S_i \text{ is selected}) = \frac{W(S_i, C)}{\sum_k W(S_k, C)},$$

where P is a probability that a particular soundtrack $S_i$ of the one or more soundtracks is selected for a cluster of visual media items (C), $S_i$ represents the particular soundtrack with index I, and W represents a weight that is dependent on a distance from a first position of the soundtrack $S_i$ to a second position assigned to C;

generating a video or a slideshow that includes the one or more soundtracks and the visual media items; and providing the video or slideshow to a user.

16. The system of claim 15, wherein the logic when executed is further operable to perform operations comprising determining at least one sound mood attribute value for at least one of the sound mood attributes, wherein the at least one sound mood attribute value indicates to an intensity of mood, and wherein the at least one sound mood attribute value is used to select the one or more soundtracks.

17. The system of claim 15, wherein the logic when executed is further operable to perform operations comprising associating at least one soundtrack with at least one sound mood attribute value, and wherein the at least one sound mood attribute value is based on one or more of the sound characteristics.

18. The system of claim 15, wherein one or more of the sound characteristics include one or more of a music key or a tempo.

19. The system of claim 15, wherein the one or more visual mood attributes are based on one or more visual characteristics, and wherein one or more of the visual characteristics include one or more of content aspect or image aspects.

20. The system of claim 15, wherein the selecting of the one or more soundtracks comprises determining the one or more soundtracks having one or more sound mood attributes that correspond to one or more visual mood attributes of the one or more visual media items.

* * * * *